(12) United States Patent
Bai

(10) Patent No.: US 7,561,806 B2
(45) Date of Patent: *Jul. 14, 2009

(54) METHOD AND SYSTEM FOR KEEPING TIMING ALIGNMENT BETWEEN DRIVING SIGNALS IN OPTICAL DOUBLE MODULATION

(75) Inventor: Yu Sheng Bai, Los Altos Hills, CA (US)

(73) Assignee: FutureWei Technologies, Inc., Plano, TX (US)

( * ) Notice: Subject to any disclaimer, the term of this patent is extended or adjusted under 35 U.S.C. 154(b) by 424 days.

This patent is subject to a terminal disclaimer.

(21) Appl. No.: 11/394,482

(22) Filed: Apr. 1, 2006

(65) Prior Publication Data

US 2006/0263095 A1 Nov. 23, 2006

Related U.S. Application Data

(63) Continuation-in-part of application No. 11/131,517, filed on May 18, 2005, now Pat. No. 7,447,443.

(51) Int. Cl.
*H04B 10/04* (2006.01)
(52) U.S. Cl. .................. 398/183; 398/184; 398/185; 398/186; 398/187; 398/188; 398/189; 398/190; 398/191; 398/192; 398/193; 398/194; 398/195; 398/196; 398/154; 398/155; 398/197; 398/198; 359/237; 359/245; 359/248; 385/1; 385/2; 385/3; 385/14; 385/31; 372/32; 372/34; 372/36; 372/38.02
(58) Field of Classification Search ............. 398/183, 398/185, 184, 186, 187, 188, 189, 190, 191, 398/192, 193, 194, 195, 196, 197, 198, 154, 398/155; 359/237, 248, 245; 385/1, 2, 3, 385/14, 31; 372/32, 34, 36, 38
See application file for complete search history.

(56) References Cited

U.S. PATENT DOCUMENTS 6,728,492 B1 4/2004 Baroncelli (Continued)

FOREIGN PATENT DOCUMENTS

CN 1174634 A 2/1998

(Continued)

OTHER PUBLICATIONS

Wichers, M. et al., "Chirped duobinary transmission (CDBT) for mitigating the self-phase modulation limiting effect", 2000 Optical Society of America, WDD43-1-WDD43-3.

(Continued)

*Primary Examiner*—Hanh Phan
(74) *Attorney, Agent, or Firm*—Townsend and Townsend and Crew LLP

(57) ABSTRACT

A method and system is disclosed for making timing alignment for a data transmission system, the method comprising providing a reference clock signal with a first frequency to a multiplexer through a phase shifter, generating a multiplexed signal with a second frequency by the multiplexer, wherein the second frequency follows the first frequency and is higher than the first frequency by a predetermined proportion, sending the multiplexed signal to a modulator, and phase shifting the reference clock signal by the phase shifter before the reference clock signal is provided to the multiplexer, wherein a timing of the multiplexed signal at the second frequency level can be adjusted by adjusting a timing of the reference clock signal at the lower first frequency level.

22 Claims, 11 Drawing Sheets

U.S. PATENT DOCUMENTS

| | | |
|---|---|---|
| 6,763,074 B1 | 7/2004 | Yang |
| 6,856,770 B2 | 2/2005 | Bai |
| 6,876,818 B1 | 4/2005 | Bai et al. |
| 7,027,735 B2 | 4/2006 | Kumar |
| 7,324,760 B2 * | 1/2008 | Gronbach et al. ........... 398/183 |
| 2002/0080817 A1 | 6/2002 | Glingener et al. ........... 370/465 |
| 2002/0149824 A1 | 10/2002 | Beaulieu et al. ............. 359/158 |
| 2003/0175037 A1 * | 9/2003 | Kimmitt et al. ............. 398/198 |
| 2006/0088321 A1 | 4/2006 | Cheung et al. |
| 2006/0263095 A1 | 11/2006 | Bai |
| 2006/0280507 A1 * | 12/2006 | Bai ........................... 398/183 |

FOREIGN PATENT DOCUMENTS

| | | |
|---|---|---|
| CN | 1304226 A | 7/2001 |
| CN | 1463109 A | 12/2003 |
| JP | 3-274835 A | 5/1991 |
| WO | WO2005/109698 A1 | 11/2005 |
| WO | WO2006/122503 A | 11/2006 |

OTHER PUBLICATIONS

Griffin, R.A., et al., "Optical Differential Quadrature Phase-Shift Key (oDQPSK) for High Capacity Optical Transmission", OFC 2002, Wednesday Afternoon, pp. 367-368.

* cited by examiner

METHOD AND SYSTEM FOR KEEPING TIMING ALIGNMENT BETWEEN DRIVING SIGNALS IN OPTICAL DOUBLE MODULATION

CROSS REFERENCE

This is a continuation-in-part of U.S. patent application Ser. No. 11/131,517, which was filed on May 18, 2005 now U.S. Pat. No. 7,447,443 and entitled "METHOD AND SYSTEM FOR KEEPING TIMING ALIGNMENT BETWEEN OPTICAL DATA MODULATION AND A PERIODICALLY MODULATED LIGHT SOURCE."

BACKGROUND

The present invention relates generally to optical data transmission, and, more particularly, to timing alignment among modulated signals in optical transmission systems.

In optical transmission with data formats other than simple NRZ format, such as a returned to zero (RZ) format, a periodically modulated light source that generates a clocklike pulse stream instead of a continuous wave light source is often used.

To achieve stable and optimized operation, the optical data modulation needs to have a fixed time delay relative to the modulated light source. For example, optimal performance of RZ transmission is usually achieved when the peak of the modulated light overlaps with the center of the data bit slot.

A conventional method to make this timing alignment is to shift the timing of the modulated light. This is because it is much easier to make time delay on a clock signal than on a broadband data signal. The timing shift of clock is made available by placing a voltage-controlled phase shifter before or after the clock driver, which is used to drive a clock modulator or a direct modulated laser (DML). The phase shift is thus at the line rate frequency. For example, if the data rate is 10 Gbps, the phase shift is at 10 GHz. In some other conventional RZ pulse generation schemes, half rate frequency can also be used for over-driving a Mach-Zehnder (MZ) modulator to generate line rate clock pulse trains. In this case, the phase shift is at a half rate frequency. In order to prevent the slow drift over time from the optimal point caused by mechanical variation, thermal variation, or other environmental changes in the relative phase, a feedback loop is often implemented to lock the relative timing between the data modulation and the light source.

In more complex modulation formats for high capacity optical transmission, there are more than one driving data signals, such as double data modulation has two driving data signals. Relative timings between the multiple driving signals are adjusted in a similar fashion, with the exception that variable delay lines are implemented rather than phase shifters, since the latter generally narrows frequency pass band and would distort the signals.

However, the high frequency phase shifters used in this conventional method are inherently complex and expensive, especially if the phase shift needs to cover a minimum 360 degrees, also known as one bit slot to those skilled in the art. For example, the insertion loss of the phase shifter may vary a lot over the phase shift range. It is also difficult to make phase shifters that have linear phase shift versus control voltage over the large range.

Variable delay lines with broad frequency responses used in double data modulation are even more expensive and difficult to use. Furthermore, when a feedback loop is used to lock the relative timing, the dithering phase shift may add undesirable time jitters to the output optical data signals.

Therefore, it is desirable to devise improved method and system for shifting and locking the timing among the driving signals in the above applications.

SUMMARY

In view of the foregoing, a method and system is disclosed for making timing alignment for a data transmission system, the method comprising providing a reference clock signal with a first frequency to a multiplexer through a phase shifter, generating a multiplexed signal with a second frequency by the multiplexer, wherein the second frequency follows the first frequency and is higher than the first frequency by a predetermined proportion, sending the multiplexed signal to a modulator, and phase shifting the reference clock signal by the phase shifter before the reference clock signal is provided to the multiplexer, wherein a timing of the multiplexed signal at the second frequency level can be adjusted by adjusting a timing of the reference clock signal at the lower first frequency level.

The construction and method of operation of the invention, however, together with additional objects and advantages thereof will be best understood from the following description of specific embodiments when read in connection with the accompanying drawings.

DESCRIPTION

The present disclosure provides a method and system that shifts and locks the phases of a plurality of signals, either a combination of a clock signal and a data signal or a plurality of data signals, using a low frequency phase shifter.

Figure 1A:
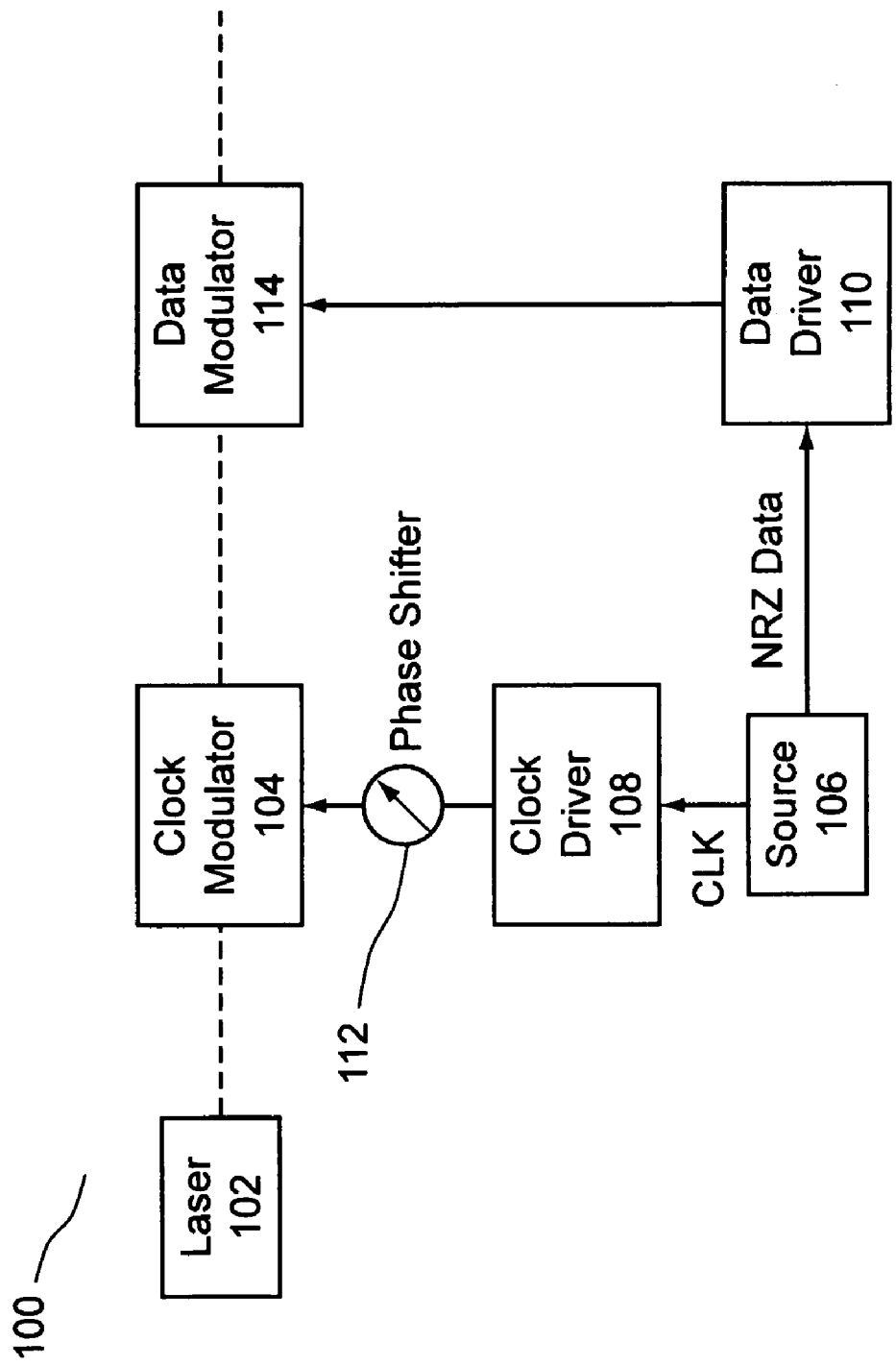
FIG. 1A illustrates a conventional RZ transmitter.

FIG. 1A illustrates a conventional RZ transmitter 100. This transmitter 100 is designed to shift the timing of the modulated light in order to provide the necessary timing alignments for stabilizing and optimizing the operation. The alignments with the broadband data signal can be done by making time delay on the clock signal.

The data of a returned-to-zero (RZ) format is generated in two stages as shown in the RZ transmitter 100. In the first stage, a carrier is generated by a continuous wave (CW) laser 102 and a clock modulator 104. A source unit 106 is designed to provide both a clock signal to a clock driver 108, as well as a set of non-returned to zero (NRZ) data to a data driver 110. The timing shift of the clock is done by placing a voltage controlled phase shifter 112 after the clock driver 108. This phase shifted time signal will drive the clock modulator 104. The phase shift is performed at the line rate frequency. For example, if the data rate is 10 Gbps, the phase shift is at 10 GHz. The periodically modulated carrier includes a stream of optical pulses shorter than a bit slot. In the other stage, a physical variable is modulated using a data modulator 114 to encode the data on the optical carrier. The data driver 110 is designed to provide the NRZ data from the source block 106 to the data modulator 114. Together with the encoded data and the periodically modulated carrier, the RZ format can be generated.

It is noted that a half rate frequency may also be used in some RZ pulse generation schemes to over-drive a Mach-Zehnder (MZ) modulator to generate line rate clock pulse trains. In this case, the phase shift is performed at a half rate frequency. However, in all return-to-zero optical transmitters, the degree of misalignment between the data and the clock paths varies with natural effects such as temperature and aging. With increasing bit rates and decreasing bit time slots, the timing variations can severely limit the transmitter performances.

Figure 1B:
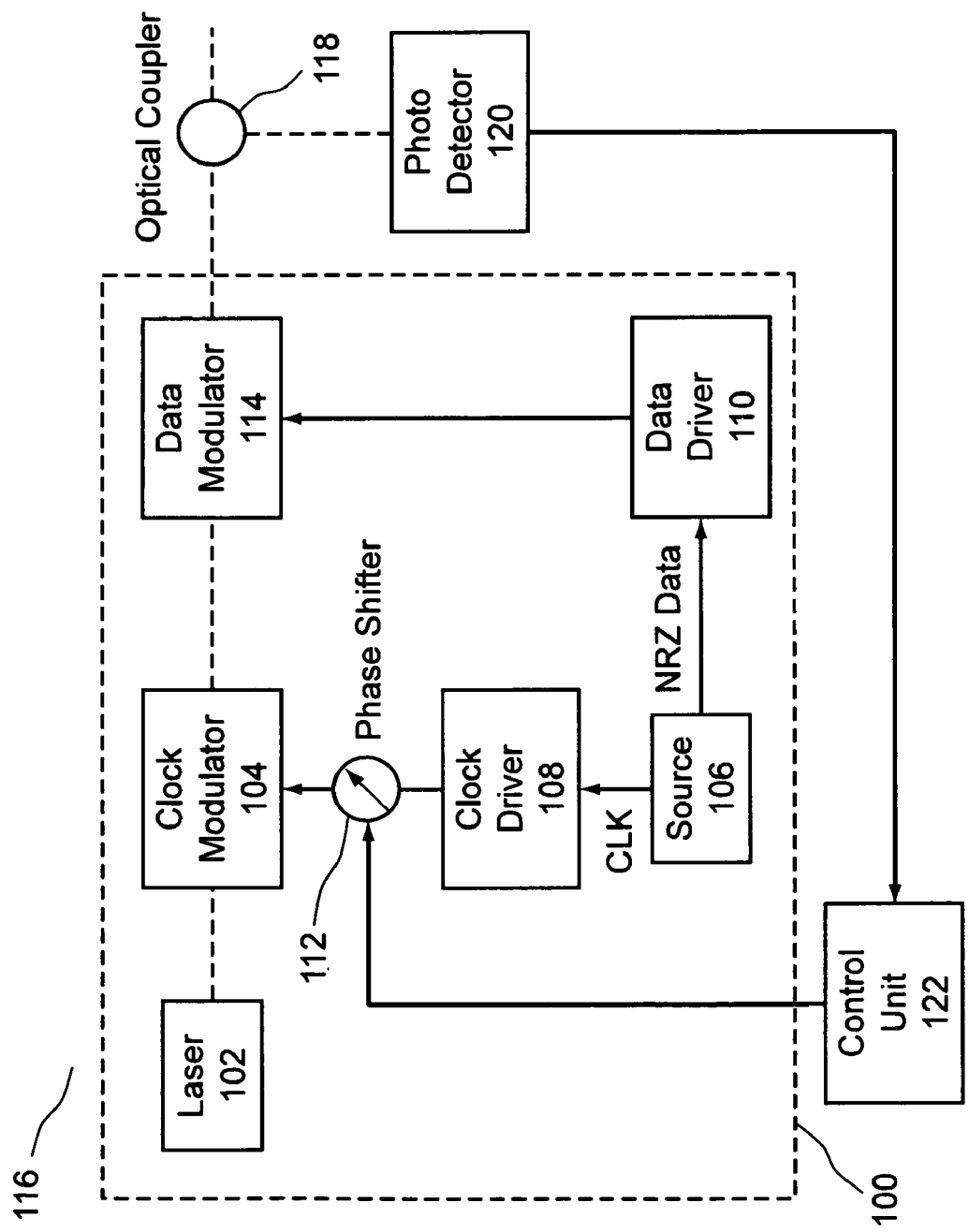
FIG. 1B illustrates a conventional RZ transmitter with a phase-locked loop.

FIG. 1B illustrates a conventional RZ transmitter 116, which includes the conventional RZ transmitter 100 and a phase lock loop. Data of the RZ format is generated using an encoded data and a carrier. As mentioned in description of FIG. 1A, the conventional RZ transmitter 100 may have misalignment between the data and the clock paths varied by natural effects such as temperature, environmental changes, mechanical variations, aging, and much more.

To prevent the misalignment from causing relative timing drift from the optimal point, a feedback loop is typically implemented to help lock the relative timing between the data modulation and the light source. This is usually done by first monitoring and analyzing the optical output, and then varying the control voltage to keep the timing alignment at an optimal value. This feedback (phase lock) loop includes an optical coupler 118 to monitor the optical output. A photo detector 120 analyzes the optical signal before allowing a control unit 122 to adjust the control voltage at the phase shifter 112.

Figure 1C:
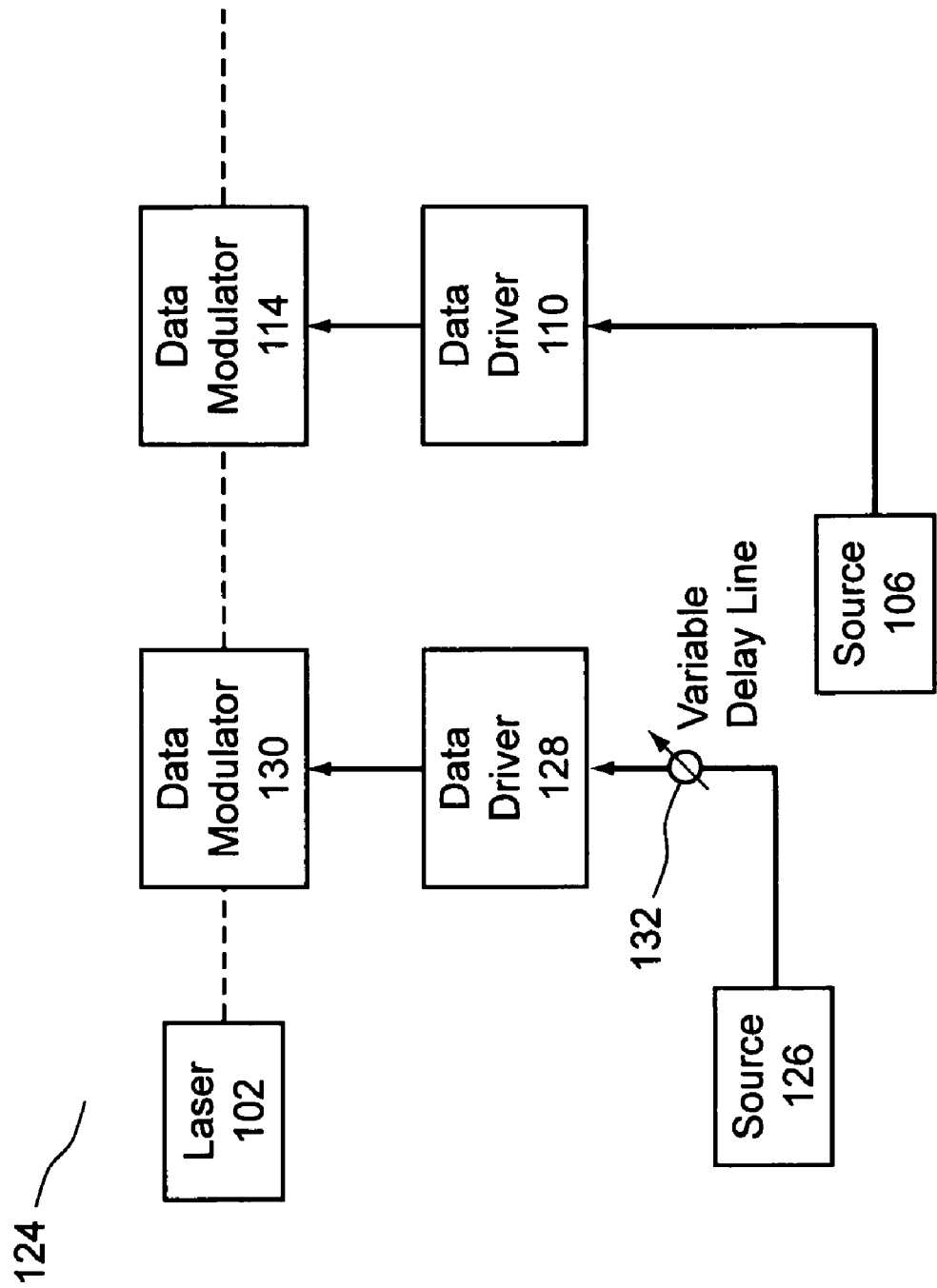
FIG. 1C illustrates a conventional double data modulation transmitter using two data modulators.

FIG. 1C illustrates a conventional double data modulation transmitter 124 with two data modulators. The transmitter 124 is designed to shift the timing of dual broadband data signals in order to provide the necessary timing alignments for stabilizing and optimizing the operation. The alignments of the dual broadband data signals can be done by making delays on one of the broadband data signals.

Data of a complex modulation format is generated in two stages as shown in the double data modulation transmitter 124. In the first stage, a carrier is generated by a continuous wave (CW) laser 102 and a data modulator 114 encodes data onto the carrier. A source block 106 is designed to provide a first data signal to a data driver 110. In the other stage, a data modulator 130 also encodes data onto the carrier. A source unit 126 is designed to provide a second data signal to a data driver 128. The first and the second signals may generally be nonidentical.

The time shift of the data signals with respect to one another is done by placing a variable delay line 132 after the data source block 126. This time shifted data signal will drive the data modulator 130. The time shift is also performed at the line rate frequency.

Figure 1D:
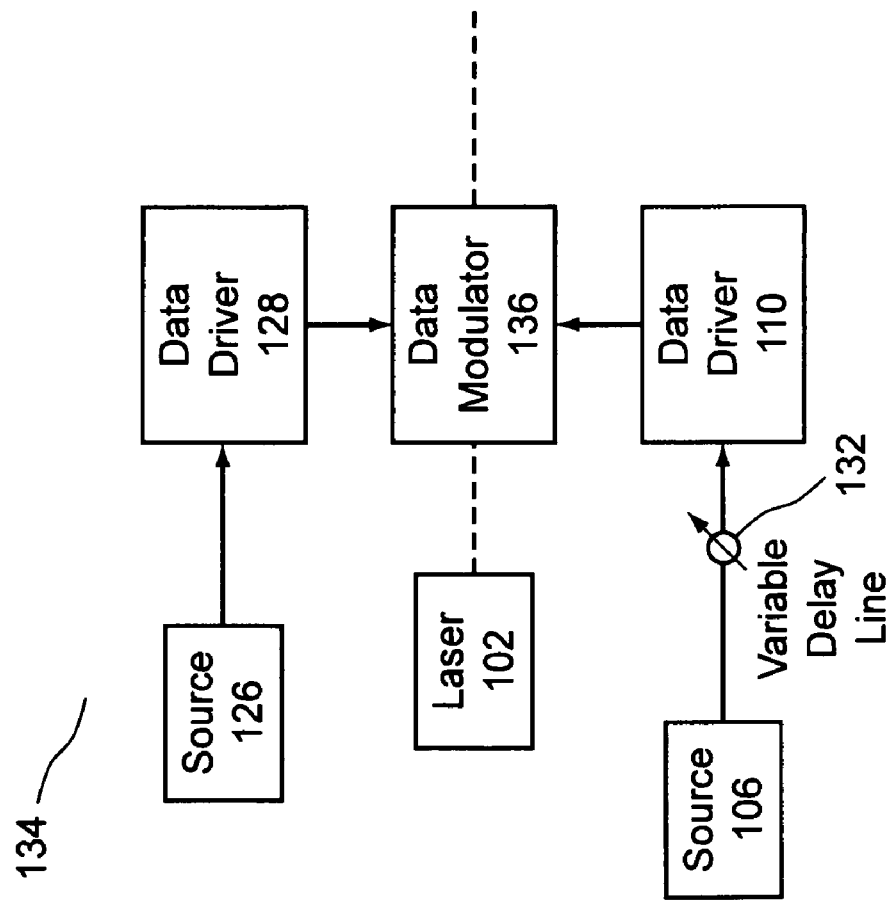
FIG. 1D illustrates a conventional double data modulation transmitter using a dual drive data modulator.

Similarly, FIG. 1D illustrates a conventional double modulation transmitter 134 with a dual drive data modulator 136 rather than two single data modulators. This transmitter 134 is designed to shift the timing of dual broadband data signals in order to provide the necessary timing alignments for stabilizing and optimizing the operation. The alignments of the dual broadband data signals can be done by making delays on one of the broadband data signals.

Data of a complex modulation format is generated in two stages in the transmitter 134 as shown in FIG. 1D. In the first stage, a carrier is generated by a continuous wave (CW) laser 102 and a dual drive data modulator 136 encodes data onto the carrier. A data source 106 is designed to provide a first data signal to a data driver 110. In the other stage, a data source 126 is designed to provide a second data signal to a data driver 128. The first and the second signals may generally be non-identical.

The time shift of the one of the two data signals is done by placing a variable delay line 132 after the data source block 106. This time shifted data signal of data source block 106 will now be aligned with the un-shifted data signal of data source 126 to drive the dual drive data modulator 136. The time shift is also performed at the line rate frequency.

In general, the average output optical power of an RZ transmitter is at the maximum when the clock peaks are aligned to the center of the bit slots if the "eye" crossing point of the NRZ modulation is lower than 50%, and at the minimum if the "eye" crossing point is higher than 50%. Thus the simplest feedback approach is to monitor the average output optical power, and vary the control voltage on the phase shifter to maximize (or minimize) the output power. To use this approach, the control unit 122 sends a dithering voltage to modulate the control voltage on the voltage controlled phase shifter 112. This dithering voltage can be in the range of tens of hertz to kilohertz.

However, the high frequency phase shifter used in conventional RZ transmitters 100 and 116 are inherently complex and expensive, especially if the phase shift needs to cover a minimum 360 degrees or one bit slot. Furthermore, when a feedback loop is used to lock the relative timing, the dithering phase shift may add undesirable time jitters to the output optical data signals.

So one embodiment of the present invention is to use low frequencies phase shifter, which is less expensive and easier to operate, to align timings of data at high, line-rate frequencies. A low frequency signal can be converted to high line rate frequency signal by a multiplexer chip.

Figure 2:
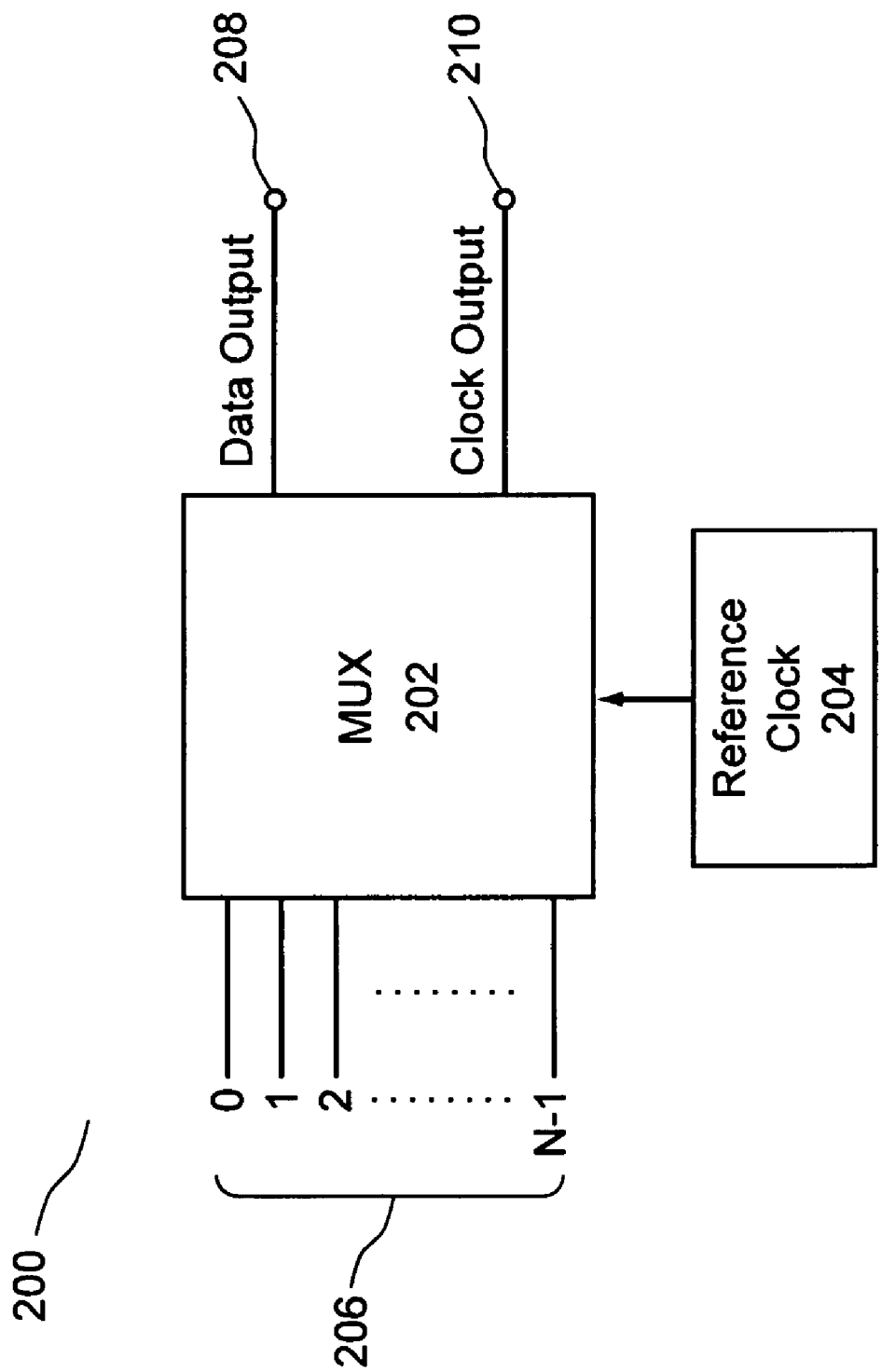
FIG. 2 illustrates an electrical parallel to serial data converter.

FIG. 2 illustrates an electrical parallel-to-serial data converter 200 to be used in various embodiments of the present invention. The electrical parallel to serial data converter 200 comprises a multiplexer (MUX) chip 202 that works with an external reference clock 204. The MUX chip 202 is designed to multiplex lower rate data inputs such as parallel outputs from some DSP chips to form outputs at a relatively high line rate. The parallel outputs of the DSP chips are typically at a data rate many times lower than the line rate. In this embodiment, therefore, the external reference clock 204 is designed to output at fractions of the line rate. Within the MUX chip 202, the clock frequency is up-converted to the line rate frequency, which is used to carry the data output. As shown in the block diagram 200, the MUX chip 202 is designed to receive N number of lower rate data inputs 206. After the up-conversion, the MUX chip 202 can provide a data output 208 and a clock output 210 to a transmitter.

Note that both the line rate clock and the data are designed to be in synchronization with the low frequency reference clock. By shifting the phase of the reference clock, both the clock and the data outputs can be adjusted more effectively. For example, since the frequency of the reference clock 204 is 1/N of the line rate, the phase shift or time shift on the line rate data output 208 or clock output 210 is N times larger.

Figure 3A:
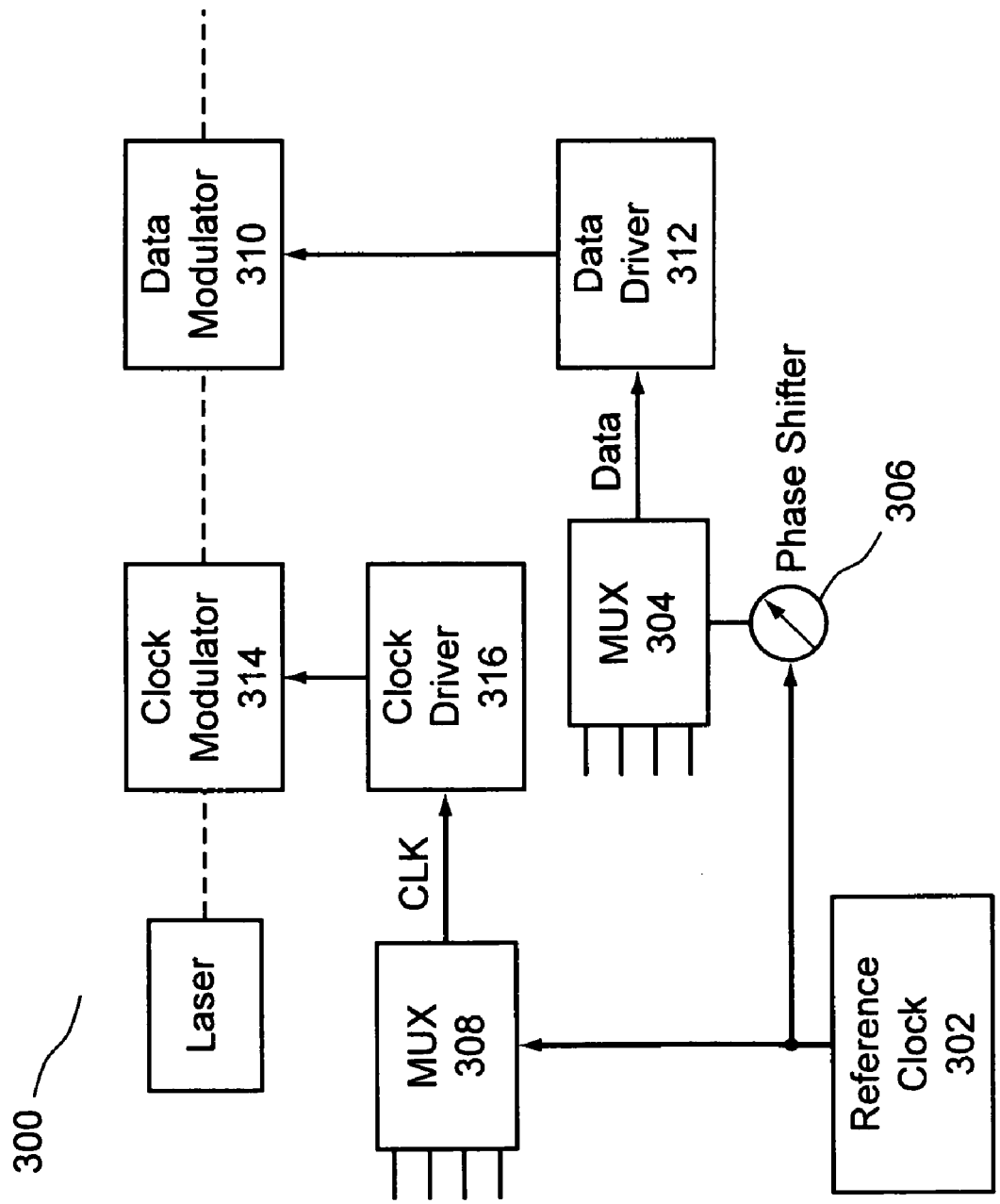
FIG. 3A illustrates an RZ-like transmitter implemented with a low frequency phase shifter in accordance with one embodiment of the present invention.

FIG. 3A illustrates a RZ-like transmitter 300 implemented with a low frequency phase shifter in accordance with one embodiment of the present invention. This method uses a low frequency phase shifter 306 to align the timing between a clocklike light source and optical data modulation for the generation of RZ-like data signals.

Referring to FIG. 3A, a reference clock generator 302 is designed to provide a reference clock signal to both a MUX 304 through a low frequency phase shifter 306 and to a MUX 308. This reference clock signal is at a predetermined frequency lower than the line rate. The MUX 304 is coupled to a data modulator 310 through a data driver 312, while the MUX 308 is coupled to a clock modulator 314 through a clock driver 316. Similar to the conventional RZ transmitter 100 shown in FIG. 1, the clock modulator is further connected to a laser source so that a periodically modulated light source can be generated by the clock modulator 314. The MUX 304 functions just like it would in a NRZ transmitter, converting the lower rate parallel data signals to the line rate serial data. The line rate serial clock output of the MUX 304 is used to drive the clock modulator 314.

The parallel inputs of the MUX 308 can be idle, or they may all be connected to ground, as the MUX 308 is designed to provide a line rate clock signal to the clock driver 316 by taking a reference clock input from the reference clock generator 302. The phase shifter 306 is designed to perform a phase adjustment on the reference clock signal before the reference clock signal reaches the MUX 304. By placing a low frequency phase shifter 306 between the reference clock generator 302 and the MUX 304, the phase adjustment of the reference clock signal can be made at a lower frequency to align a timing of data modulator 310 with a periodically modulated light source of the clock modulator 314.

Figure 3B:
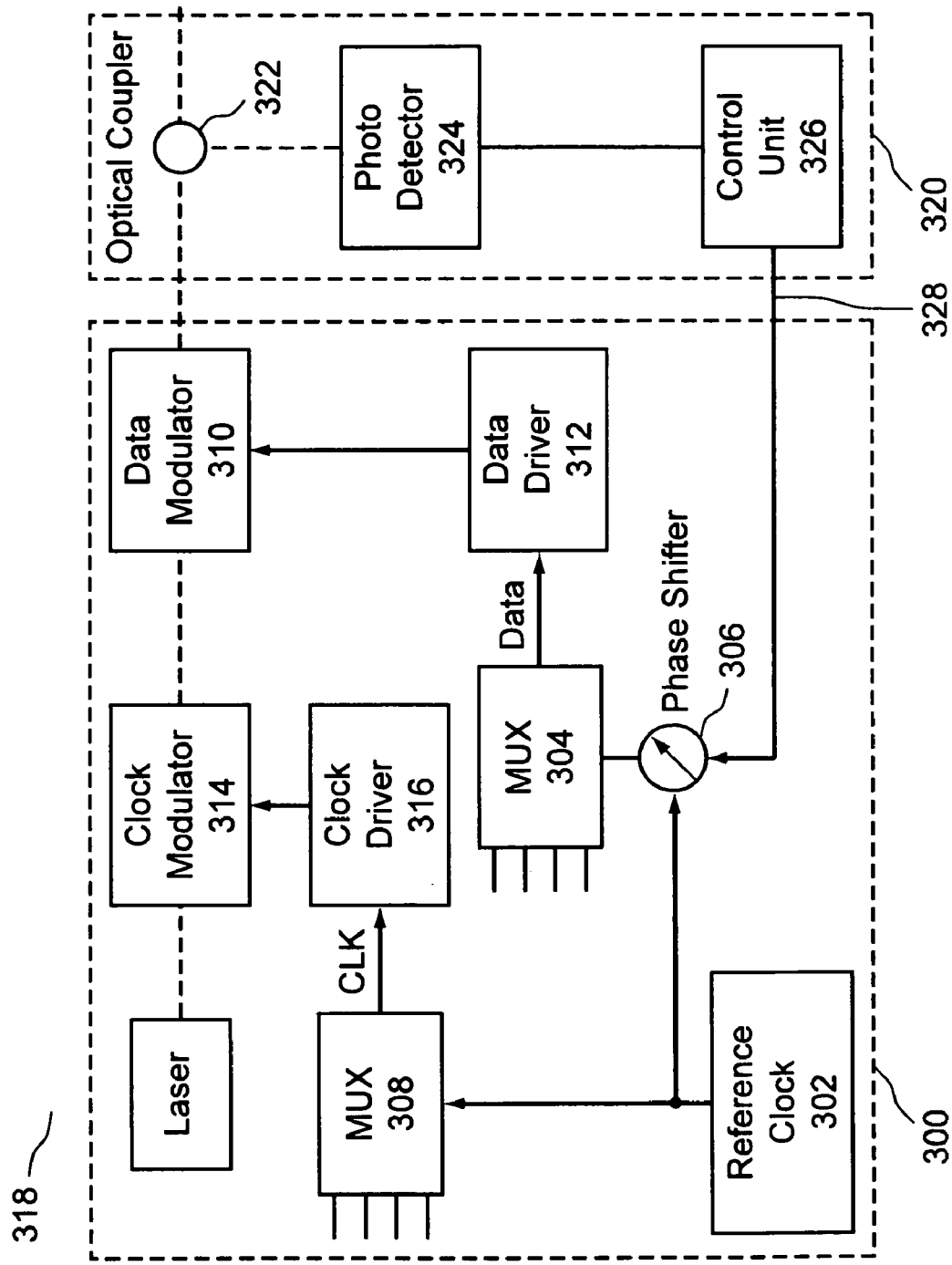
FIG. 3B illustrates an RZ-like transmitter implemented with a low frequency phase shifter and an optical coupler phase-locked loop in accordance with one embodiment of the present invention.

To avoid misalignment and relative timing drift from the optimal point, a feedback loop is implemented to this method as shown in FIG. 3B to help lock the relative timing to the optimal alignment by monitoring the average output optical power and controlling the voltage on the phase shifter accordingly.

FIG. 3B illustrates an RZ-like transmitter 318 implemented with a low frequency phase shifter and a phase lock loop in accordance with one embodiment of the present invention. In this embodiment, the RZ-like transmitter 318 includes both the RZ-like transmitter 300 as described in FIG. 3A and a phase lock loop 320. As described above, misalignment can occur between the data and the clock paths varied by natural effects such as temperature, environmental changes, mechanical variations, aging, and much more. To prevent the misalignment from causing relative timing drift from the optimal point, a feedback loop is typically implemented to help lock the relative timing between the data modulation and the light source. This is usually done by first monitoring and analyzing the optical output, and then by varying the control voltage to keep the timing alignment at an optimal value.

The phase lock loop 320, including an optical coupler 322, a photo detector 324, and a control unit 326, is implemented as a feedback loop for locking the relative timing to the optimal alignment. The optical coupler 322 is placed along with the clock modulator 314 and the data modulator 310 to monitor the optical output. The photo detector 324 analyzes the optical signal before allowing a control unit 326 to send a feedback control signal 328 for adjusting the control voltage at the phase shifter 306.

Since the average output optical power of a RZ transmitter is usually at the maximum when the clock peaks are aligned to the center of the bit slots, the simplest feedback approach is to monitor the average power of the optical output, and vary the control voltage on the phase shifter to maximize the output power. To use this approach, the control voltage on the phase shifter is usually dithered (e.g., small modulations in the range of tens of hertz to kilohertz) to generate a necessary feedback signal. In this example, the average power of the optical output is monitored, and the control voltage on the phase shifter 306 may be dithered to generate the necessary feedback signal allowing the control voltage on the phase shifter 306 to be varied to maximize the output power.

Figure 3C:
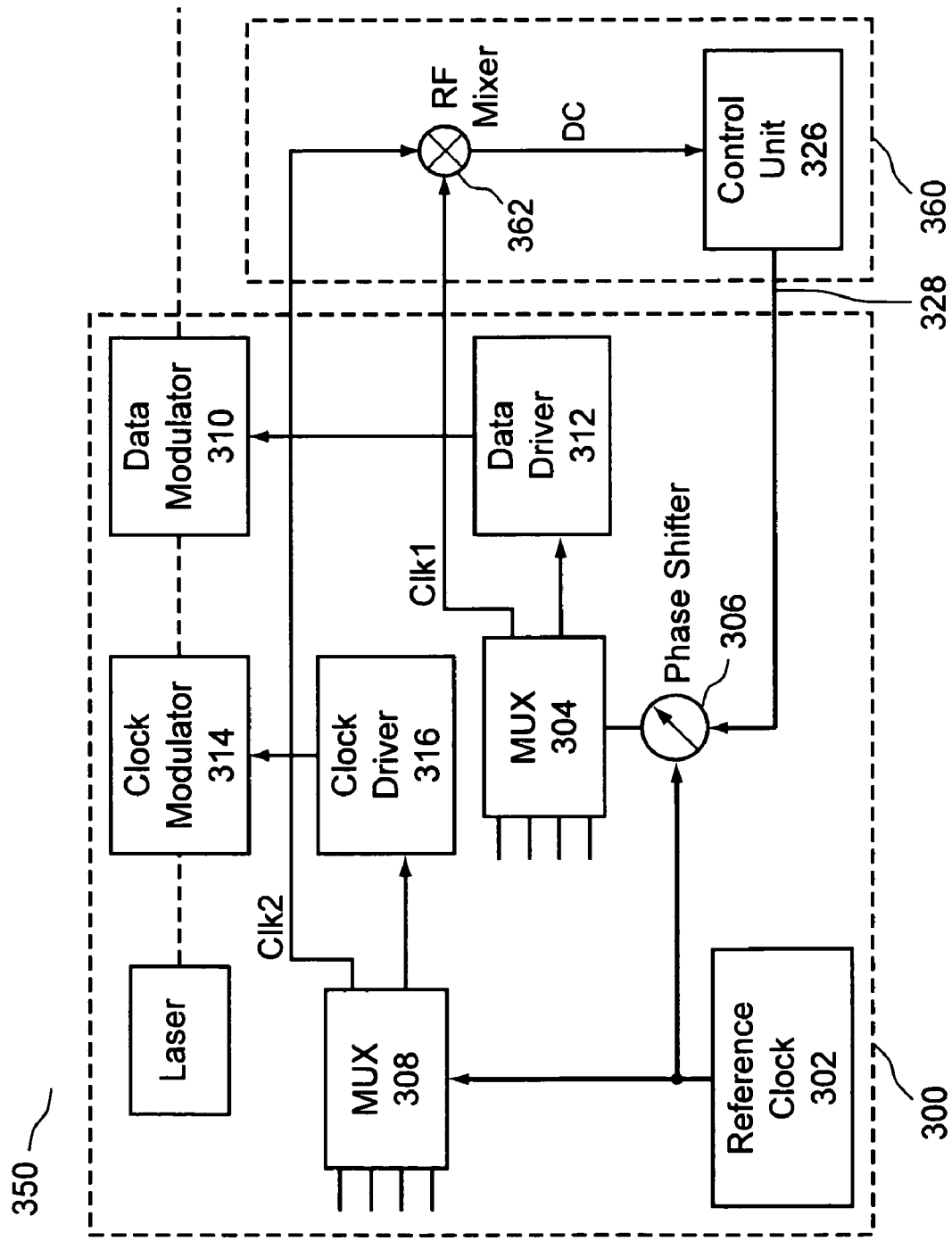
FIG. 3C illustrates an RZ-like transmitter implemented with a low frequency phase shifter and an RF-mixer phase-locked loop in accordance with one embodiment of the present invention.

FIG. 3C shows an alternative feedback loop to the one shown in FIG. 3B. Referring to FIG. 3C the feedback loop can be designed to have the MUX 304 and the MUX 308 provide an additional line rate clock signals, respectively, in addition to the signals they send to their respective drivers. By comparing these clock signals from the MUX 304 and the MUX 308, an error signal can be generated and fed back to the control unit 326 for further adjusting the phase shifter 306. For example, the phase difference between these two signals can be indicated by a DC voltage level derived from the error signal based on two clock signals using an RF mixer 362 to combine the signals.

It is also understood that the phase adjustment at the lower rate can be done on the clock side instead of the data side. In another embodiment, the low frequency phase shifter 306 is placed in the clock path before the MUX 308 instead of in the data path before the MUX 304. However, the preferred embodiment is to place the low frequency phase shifter 306 before the MUX 304, since the timing of the clocklike pulse stream will not be affected by the dithering processes, and the time jitter on the RZ output is thus minimized.

Figure 4A:
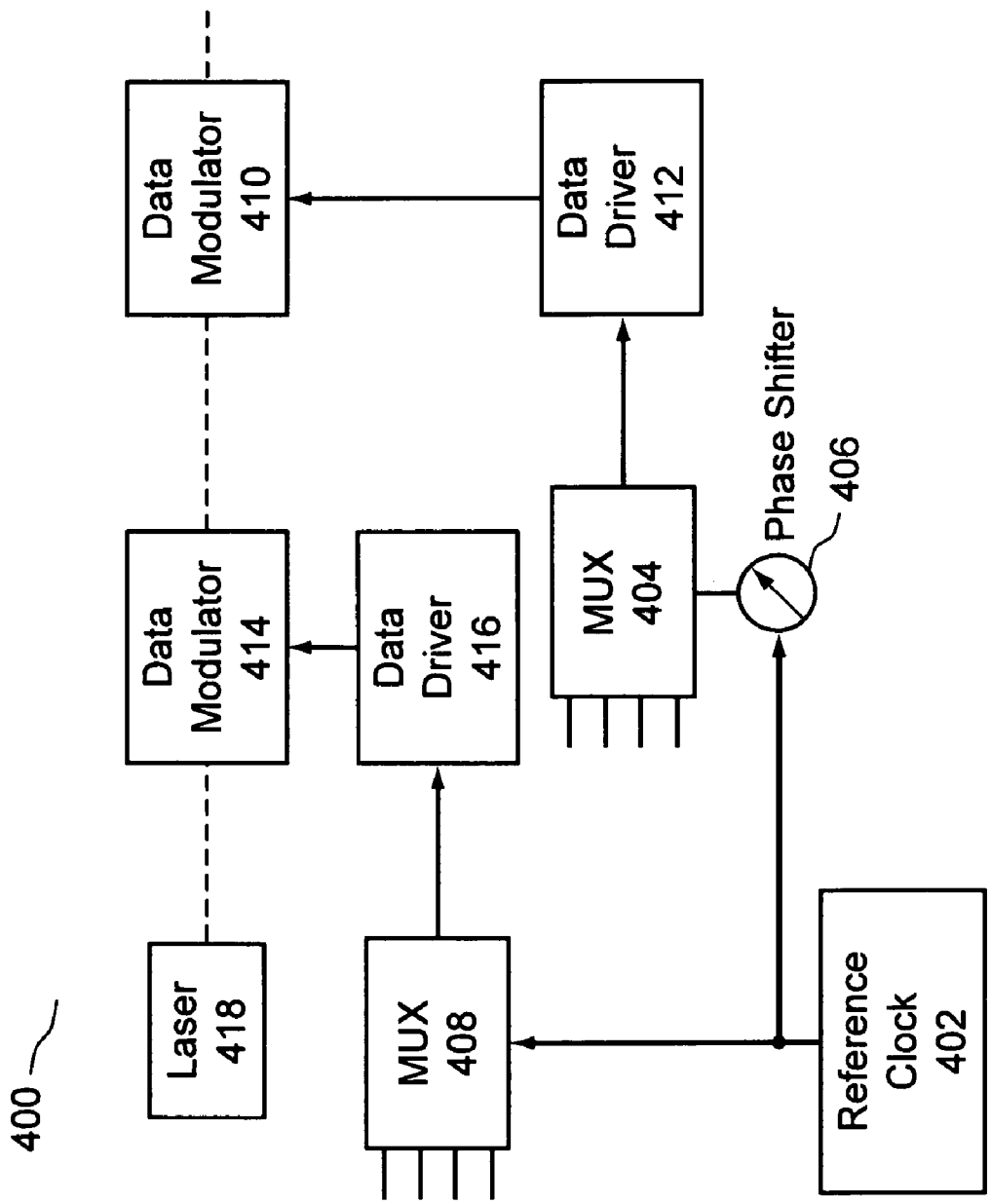
FIG. 4A illustrates a double data modulation transmitter implemented with a low frequency phase shifter in accordance with one embodiment of the present invention.

Turning to FIG. 4A, a double data modulation transmitter in accordance with one embodiment of the present invention is illustrated. A reference clock generator 402 is designed to provide a reference clock signal directly to a MUX 408 and also to a MUX 404 through a low frequency phase shifter 406. This reference clock signal is set at a predetermined frequency lower than the line rate frequency. The MUX 404 converts lower frequency parallel data signals to a line rate frequency serial data signal, which is then sent to a data modulator 410 through a data driver 412. Likewise, the MUX 408 converts lower frequency parallel data signals to another line rate frequency serial data signal, which is then sent to another data modulator 414 through another data driver 416. Similar to the conventional double data modulation transmitter 124 shown in FIG. 1C, the data modulator 410 and the data modulator 414 are further coupled to a laser source 418 so that a data encoded carrier can be generated.

Referring to FIG. 4A, a phase shifter 406 is designed to perform a phase adjustment on the reference clock signal before the reference clock signal reaches the MUX 404, so that the phase shifter 406 can be a low frequency phase shifter.

This transmitter 400 can also achieve timing alignment between the data signal from the MUX 408 and the data signal from the MUX 404, yet, with the inexpensive and easy to operate low frequency phase shifter 406.

Figure 4B:
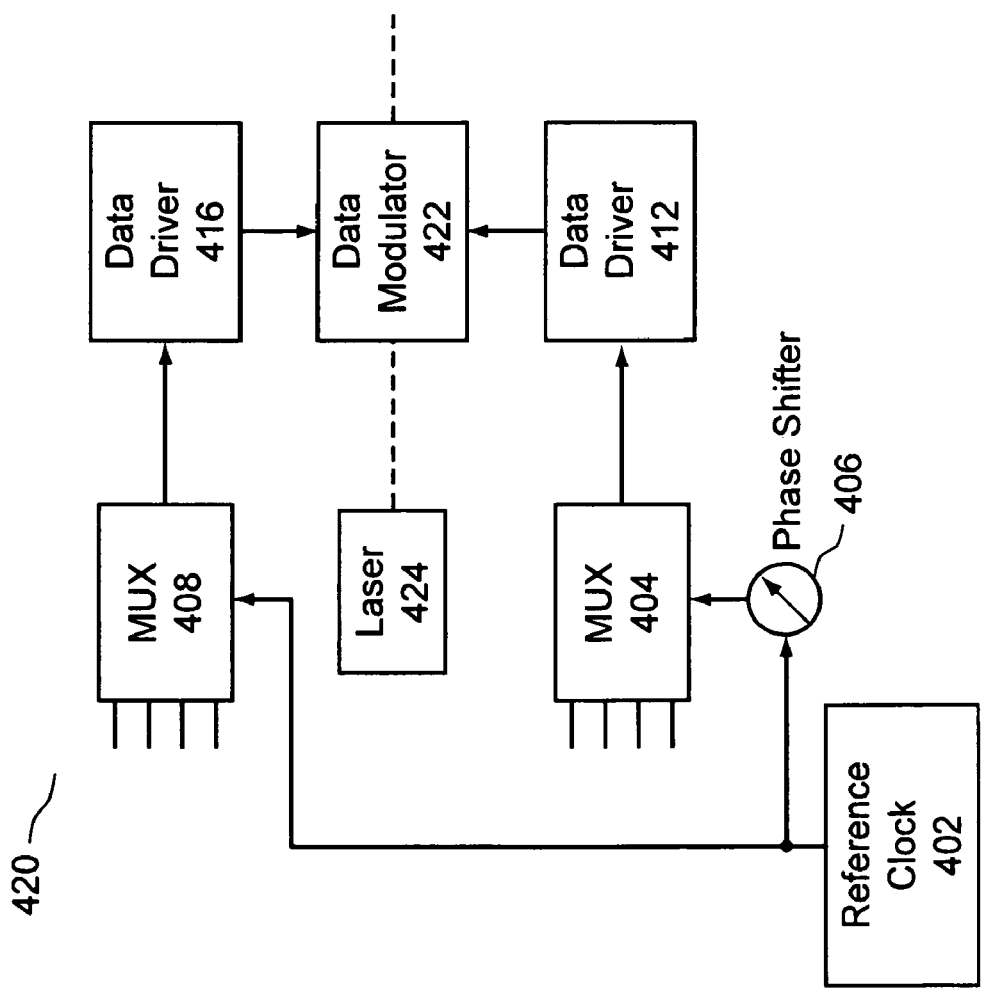
FIG. 4B illustrates a double data modulation transmitter using a dual drive data modulator and implemented with a low frequency phase shifter in accordance with one embodiment of the present invention.

FIG. 4B illustrates a double data modulation transmitter using a dual drive data modulator and also implemented with a low frequency phase shifter in accordance with one embodiment of the present invention. A reference clock generator 402 is designed to provide a reference clock signal directly to a MUX 408 and also to a MUX 404 through a low frequency phase shifter 406. The reference clock signal is at a predetermined frequency lower than the line rate. The MUX 404 is coupled to a dual drive data modulator 422 through a data driver 412, and likewise the MUX 408 is also coupled to the dual drive data modulator 422 through a data driver 416. Similar to the conventional RZ transmitter 134 as shown in FIG. 1D, the dual drive data modulator 422 is further connected to a laser source 424 so that the data encoded carrier can be generated. The MUX 404 and the MUX 408 convert the lower rate parallel data signals to the line rate serial data signals. The line rate serial data signals from the MUX 404 and the MUX 408 are used to drive the dual drive data modulator 422.

The phase shifter 406 is designed to perform a phase adjustment on the reference clock signal before the reference clock signal reaches the MUX 404. By placing a low frequency phase shifter 406 between the reference clock generator 402 and the MUX 404, the phase adjustment of the reference clock signal can be made at a lower frequency to align timings of the data signals sent to the modulator 422.

It is also understood that the phase adjustment at the lower frequency can be done on either one of the two data signals, i.e., the phase shifter 406 can be instead placed before the MUX 408. It is also understood that the principle of using low frequency phase shifter to adjust timing alignment between line rate frequency data signals can be extended to more than two data modulators.

To avoid misalignment and relative timing drift from the optimal point, a feedback loop can be implemented to both transmitters 400 and 420 shown in FIGS. 4A and 4B, similar to the phase-locked loops 320 and 360 shown in FIGS. 3B and 3C, respectively.

Figure 4C:
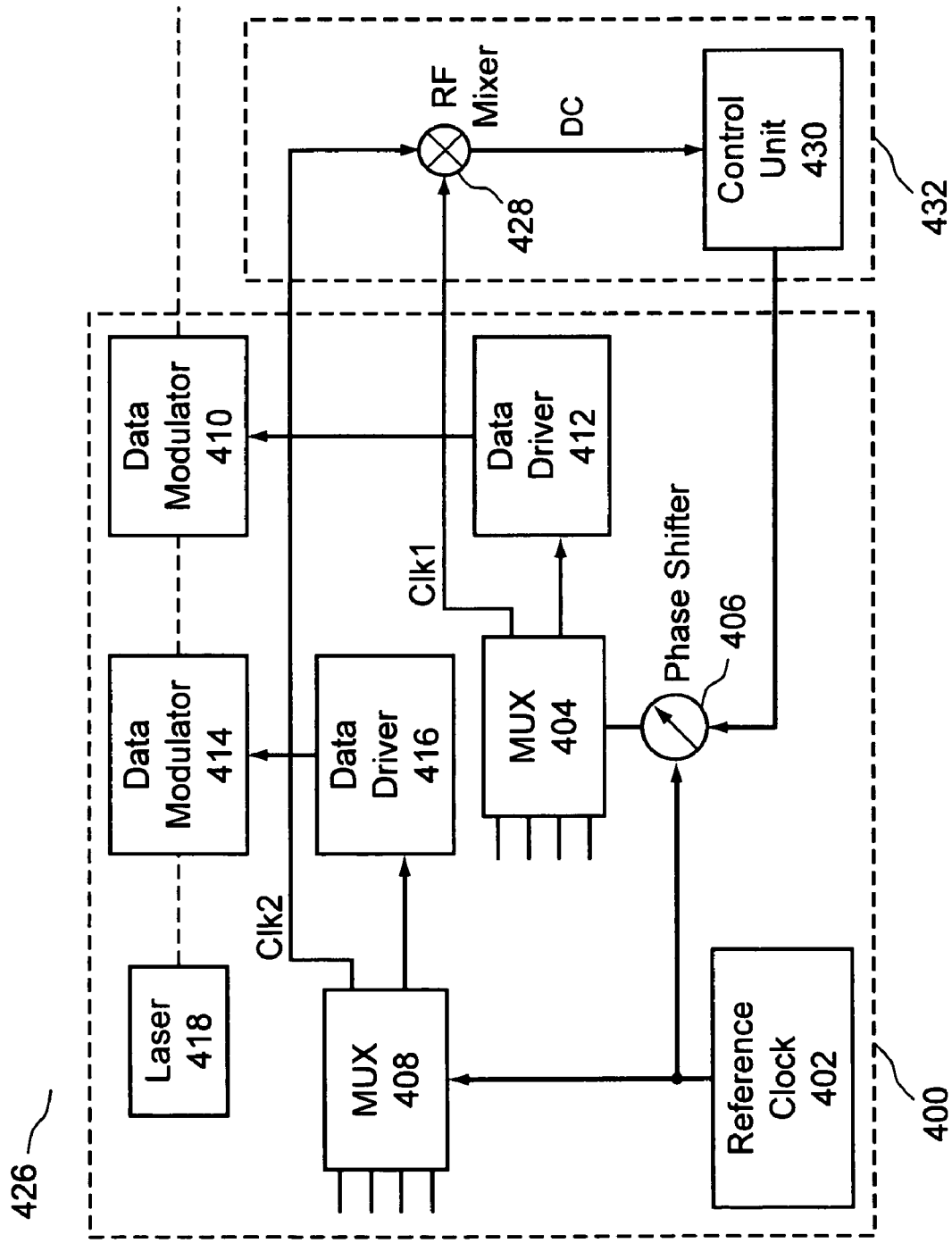
FIG. 4C illustrates a double data modulation transmitter using a plurality of data modulators, and implemented with a low frequency phase shifter and an RF mixer phase-locked loop in accordance with one embodiment of the present invention.

As an example, FIG. 4C illustrates a transmitter 426 using a RF mixer 428 phase-locked loop to form a feedback for the double data modulation transmitter 400. The MUXs 404 and 408 are made to output two signals, one is a data signal, and the other is a clock signal. The clock signals from the MUX 404 and the MUX 408 are sent to a RF mixer 428, which detects any phase difference between the two clock signals. The phase difference is then provided to a control unit 430, which analyzes the phase difference and then generates a feedback voltage accordingly to control the phase shifter 406. A particular phase difference corresponds to the optimal overlap between the data modulator 410 and the data modulator 414. The control unit 430 then varies the low frequency shifter 406 to lock to an optimal voltage. To use this approach, the control voltage on the phase shifter is usually dithered (e.g., small modulations in the range of tens of hertz to kilohertz) to effect the desired alignment of the data modulators.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for making timing alignment for a data transmission system, the method comprising:
   providing a reference clock signal with a first frequency to a first multiplexer through a phase shifter;
   providing the reference clock signal to a second multiplexer;
   generating a first multiplexed signal with a second frequency by the first multiplexer, wherein a second frequency follows the first frequency and is higher than the first frequency by a predetermined proportion;
   generating a second multiplexed signal by the second multiplexer based on the referenced clock signal and according to the predetermined proportion;
   sending the first multiplexed signal to a first modulator, wherein the first multiplexed signal is a data signal and the first modulator is a data signal modulator;
   sending the second multiplexed signal to a second modulator, wherein the second multiplexed signal is a data signal and the second modulator is a data signal modulator; and
   phase shifting the reference clock signal by the phase shifter before the reference clock signal is provided to the first multiplexer,
   wherein a timing of the first multiplexed signal at the second frequency can be adjusted by adjusting a timing of the reference clock signal at the first frequency.

2. The method of claim 1 further comprising driving before sending the first multiplexed signal to the first modulator.

3. The method of claim 1 wherein the timings of the first and second multiplexed signals are aligned.

4. The method of claim 3 further comprising driving before sending the second multiplexed signal to the second modulator.

5. The method of claim 3 further comprising:
   generating a feedback control signal based on a phase difference between a first modulator output and a second modulator output; and
   controlling the phase shifting by the phase shifter according to the feedback control signal,
   wherein an optimal alignment of timings of the first and second multiplexed signals can be locked.

6. A method for making timing alignment for a data transmission system, the method comprising:
   providing a reference clock signal with a first frequency to a first multiplexer through a phase shifter;
   generating a first multiplexed signal with a second frequency by the first multiplexer, wherein a second frequency follows the first frequency and is higher than the first frequency by a predetermined proportion;
   sending the first multiplexed signal to a first modulator;
   phase shifting the reference clock signal by the phase shifter before the reference clock signal is provided to the first multiplexer,
   wherein a timing of the first multiplexed signal at the second frequency can be adjusted by adjusting a timing of the reference clock signal at the first frequency;
   providing the reference clock signal to a second multiplexer;

generating a second multiplexed signal by the second multiplexer based on the reference clock signal and according to the predetermined proportion;

sending the second multiplexed signal to a second modulator, wherein the timings of the first and second multiplexed signals are aligned;

generating a first multiplexed clock signal identical to the first multiplexed signal by the first multiplexer;

generating a second multiplexed clock signal identical to the second multiplexed signal by the second multiplexer;

generating a feedback control signal based on a phase difference between the first multiplexed clock signal and the second multiplexed clock signal; and controlling the phase shifting by the phase shifter according to the feedback control signal, wherein an optimal alignment of timings of the first and second multiplexed signals can be locked.

7. A method for making timing alignment for a data transmission system, the method comprising:

providing a reference clock signal with a first frequency to a first multiplexer through a phase shifter;

providing the reference clock signal directly to a second multiplexer;

generating a first multiplexed signal with a second frequency by the first multiplexer, wherein the second frequency follows the first frequency and is higher than the first frequency by a predetermined proportion;

generating a second multiplexed signal by the second multiplexer based on the reference clock signal and according to the predetermined proportion;

sending the first multiplexed signal to a first modulator, wherein the first multiplexed signal is a data signal and the first modulator is a data signal modulator;

sending the second multiplexed signal to a second modulator, wherein the second multiplexed signal is a data signal and the second modulator is a data signal modulator; and phase shifting the reference clock signal by the phase shifter before the reference clock signal is provided to the first multiplexer, wherein timings of the first and second multiplexed signals can be aligned by adjusting a timing of the reference clock signal provided to the first multiplexer at the first frequency.

8. The method of claim 7 further comprising driving before sending the first multiplexed signal to the first modulator.

9. The method of claim 7 further comprising driving before sending the second multiplexed signal to the second modulator.

10. The method of claim 7 further comprising:

generating a feedback control signal based on a phase difference between a first modulator output and a second modulator output; and controlling the phase shifting by the phase shifter according to the feedback control signal, wherein an optimal alignment of timings of the first and second multiplexed signals can be locked.

11. A method for making timing alignment for a data transmission system, the method comprising:

providing a reference clock signal with a first frequency to a first multiplexer through a phase shifter;

providing the reference clock signal directly to a second multiplexer;

generating a first multiplexed signal with a second frequency by the first multiplexer, wherein the second frequency follows the first frequency and is higher than the first frequency by a predetermined proportion;

generating a second multiplexed signal by the second multiplexer based on the reference clock signal and according to the predetermined proportion;

sending the first multiplexed signal to a first modulator;

sending the second multiplexed signal to a second modulator;

phase shifting the reference clock signal by the phase shifter before the reference clock signal is provided to the first multiplexer, wherein timings of the first and second multiplexed signals can be aligned by adjusting a timing of the reference clock signal provided to the first multiplexer at the first frequency;

generating a first multiplexed clock signal identical to the first multiplexed signal by the first multiplexer;

generating a second multiplexed clock signal identical to the second multiplexed signal by the second multiplexer;

generating a feedback control signal based on a phase difference between the first multiplexed clock signal and the second multiplexed clock signal; and controlling the phase shifting by the phase shifter according to the feedback control signal, wherein an optimal alignment of timings of the first and second multiplexed signals can be locked.

12. A data transmission system with timing alignment, the system comprising:

a reference clock generating a first reference clock signal with a first frequency, the reference clock generating a second reference clock signal with the first frequency;

a first multiplexer receiving the first reference clock signal and generating a first multiplexed signal with a second frequency based on the first reference clock signal, wherein the second frequency follows the first frequency and is higher than the first frequency by a predetermined proportion, wherein the first multiplexed signal is a data signal;

a second multiplexer directly receiving the second reference clock signal and generating a second multiplexed signal based on the second reference clock signal and according to the predetermined proportion, wherein the second multiplexed signal is a data signal;

a first modulator coupled to the first multiplexer for modulating the first multiplexed signal, wherein the first modulator is a data signal modulator;

a second modulator receiving the second multiplexed signal, wherein the second modulator is a data signal modulator; and a phase shifter coupled between the reference clock and the first multiplexer for making phase adjustment to the first reference clock signal so that a timing of the first multiplexed signal can be adjusted at the first frequency.

13. The system of claim 12 further comprising a signal driver coupled between the first multiplexer and the first modulator for driving the first multiplexed signal.

14. The system of claim 12 wherein the timings of the first and second multiplexed signals are aligned.

15. The system of claim 14 further comprising a second driver coupled between the second multiplexer and the second modulator for driving the second multiplexed signal.

16. The system of claim 14 further comprising:

one or more optical couplers coupled to a first output signal from the first modulator and a second output signal from the second modulator;

a photo detector coupled to the optical couples for analyzing a phase difference between the first output signal and the second output signal; and a control unit coupled between the photo detector and the phase shifter for generating a control signal based on the phase difference to control the phase shifting, wherein an optimal alignment of timings of the first and second multiplexed signals can be locked.

17. A data transmission system with timing alignment, the system comprising:

a reference clock generating a first reference clock signal with a first frequency;

a first multiplexer receiving the first reference clock signal and generating a first multiplexed signal with a second frequency based on the first reference clock signal, wherein the second frequency follows the first frequency and is higher than the first frequency by a predetermined proportion;

a first modulator coupled to the first multiplexer for modulating the first multiplexed signal;

a phase shifter coupled between the reference clock and the first multiplexer for making phase adjustment to the first reference clock signal so that a timing of the first multiplexed signal can be adjusted at the first frequency;

the reference clock generating a second reference clock signal with the first frequency a second multiplexer directly receiving the second reference clock signal and generating a second multiplexed signal based on the second reference clock signal and according to the predetermined proportion;

a second modulator receiving the second multiplexed signal, wherein the timings of the first and second multiplexed signals are aligned;

a first multiplexed clock signal identical to the first multiplexed signal both are generated by the first multiplexer;

a second multiplexed clock signal identical to the second multiplexed signal both are generated by the second multiplexer;

a radio frequency (RF) mixer coupled to both the first and second multiplexers for detecting a phase difference between the first and second multiplexed clock signals; and a control unit coupled between the RF mixer and the phase shifter for generating a control signal based on the phase difference to control the phase shifting, wherein an optimal alignment of timings of the first and second multiplexed signals can be locked.

18. A data transmission system with timing alignment, the system comprising:

a reference clock generating a first and a second reference clock signals both with a first frequency;

a first multiplexer receiving the first reference clock signal and generating a first multiplexed signal with a second frequency based on the first reference clock signal, wherein the second frequency follows the first frequency and is higher than the first frequency by a predetermined proportion, wherein the first multiplexed signal is a data signal;

a second multiplexer receiving the second reference clock signal and generating a second multiplexed signal based on the second reference clock signal and according to the predetermined proportion, wherein the second multiplexed signal is a data signal;

a first modulator coupled to the first multiplexer for modulating the first multiplexed signal, wherein the first modulator is a data signal modulator;

a second modulator coupled to the second multiplexer for modulating the second multiplexed signal, wherein the second multiplexed signal is a data signal modulator; and a phase shifter coupled between the reference clock and the first multiplexer for making phase adjustment to the first reference clock signal so that a timing of the first multiplexed signal can be adjusted at the first frequency.

19. The system of claim 18 further comprising a first signal driver coupled between the first multiplexer and the first modulator for driving the first multiplexed signal.

20. The system of claim 18 further comprising a second signal driver coupled between the second multiplexer and the second modulator for driving the second multiplexed signal.

21. The system of claim 18 further comprising:

one or more optical couplers coupled to a the first output signal from the first modulator and a second output signal from the second modulator;

a photo detector coupled to the optical couples for analyzing a phase difference between the first output signal and the second output signal; and a control unit coupled between the photo detector and the phase shifter for generating a control signal based on the phase difference to control the phase shifting, wherein an optimal alignment of timings of the first and second multiplexed signals can be locked.

22. A data transmission system with timing alignment, the system comprising:

a reference clock generating a first and a second reference clock signals both with a first frequency;

a first multiplexer receiving the first reference clock signal and generating a first multiplexed signal with a second frequency based on the first reference clock signal, wherein the second frequency follows the first frequency and is higher than the first frequency by a predetermined proportion;

a second multiplexer receiving the second reference clock signal and generating a second multiplexed signal based on the second reference clock signal and according to the predetermined proportion;

a first modulator coupled to the first multiplexer for modulating the first multiplexed signal;

a second modulator coupled to the second multiplexer for modulating the second multiplexed signal;

a phase shifter coupled between the reference clock and the first multiplexer for making phase adjustment to the first reference clock signal so that a timing of the first multiplexed signal can be adjusted at the first frequency;

a first multiplexed clock signal identical to the first multiplexed signal both are generated by the first multiplexer;

a second multiplexed clock signal identical to the second multiplexed signal both are generated by the second multiplexer;

a radio frequency (RF) mixer coupled to both the first and second multiplexers for detecting a phase difference between the first and second multiplexed clock signals; and a control unit coupled between the RF mixer and the phase shifter for generating a control signal based on the phase difference to control the phase shifting, wherein an optimal alignment of timings of the first and second multiplexed signals can be locked.

* * * * *